United States Patent [19]

Clasky et al.

[11] Patent Number: 4,565,149

[45] Date of Patent: Jan. 21, 1986

[54] SEMI-SUBMERGIBLE SPHERICAL RESIDENTIAL STRUCTURE

[75] Inventors: Richard Clasky, 2307 Panorama Dr., North Vancouver, British Columbia; Wilfred Vogl, West Vancouver, both of Canada

[73] Assignee: Richard Clasky, Vancouver, Canada

[21] Appl. No.: 734,146

[22] Filed: May 15, 1985

Related U.S. Application Data

[62] Division of Ser. No. 357,181, Mar. 11, 1982, abandoned.

[51] Int. Cl.$^4$ ................................................. F24V 3/02
[52] U.S. Cl. .......................................... 114/264; 52/80; 52/745; 405/195; 264/32
[58] Field of Search .................... 52/167, 169.1, 80; 114/264, 265, 125; 405/195, 188, 189, 194, 224

[56] References Cited

U.S. PATENT DOCUMENTS

| | | | |
|---|---|---|---|
| 1,088,239 | 2/1914 | Paine | 52/167 |
| 2,166,577 | 7/1939 | Beckias | 52/167 |
| 2,338,354 | 1/1944 | Phillips | 114/264 |
| 3,249,664 | 5/1966 | Grergii | 264/32 |
| 3,572,043 | 3/1971 | Clara | 114/264 |
| 3,916,578 | 11/1975 | Forootan | 52/80 |
| 4,117,691 | 10/1978 | Spray | 114/264 |
| 4,186,532 | 2/1980 | Kahn | 52/169.1 |
| 4,228,788 | 10/1980 | Moeser | 114/125 |
| 4,406,243 | 9/1983 | Kim | 114/264 |
| 4,502,551 | 3/1985 | Rule | 114/264 |

FOREIGN PATENT DOCUMENTS

| | | | |
|---|---|---|---|
| 1081340 | 5/1960 | Fed. Rep. of Germany | 114/264 |
| 564843 | 6/1957 | Italy | 52/169.1 |
| 1527887 | 10/1978 | United Kingdom | 114/264 |

OTHER PUBLICATIONS

Sanders Associates Publication.

Primary Examiner—Henry E. Raduazo
Attorney, Agent, or Firm—Fulwider, Patton, Rieber, Lee & Utecht

[57] ABSTRACT

A semi-submergible spherical residential structure adapted to be floated in a body of water. The structure features a substantially spherical shell having a hollow annular sponson affixed around its maximum girth such that the sponson is parallel to the water surface when the structure is floating in a body of water. The outer diameter of the sponson is sufficiently large so as to stabilize the shell when floating and the sponson has a width which is sufficiently great so as to provide adequate reserve buoyancy to the structure when the latter is weighted.

5 Claims, 5 Drawing Figures

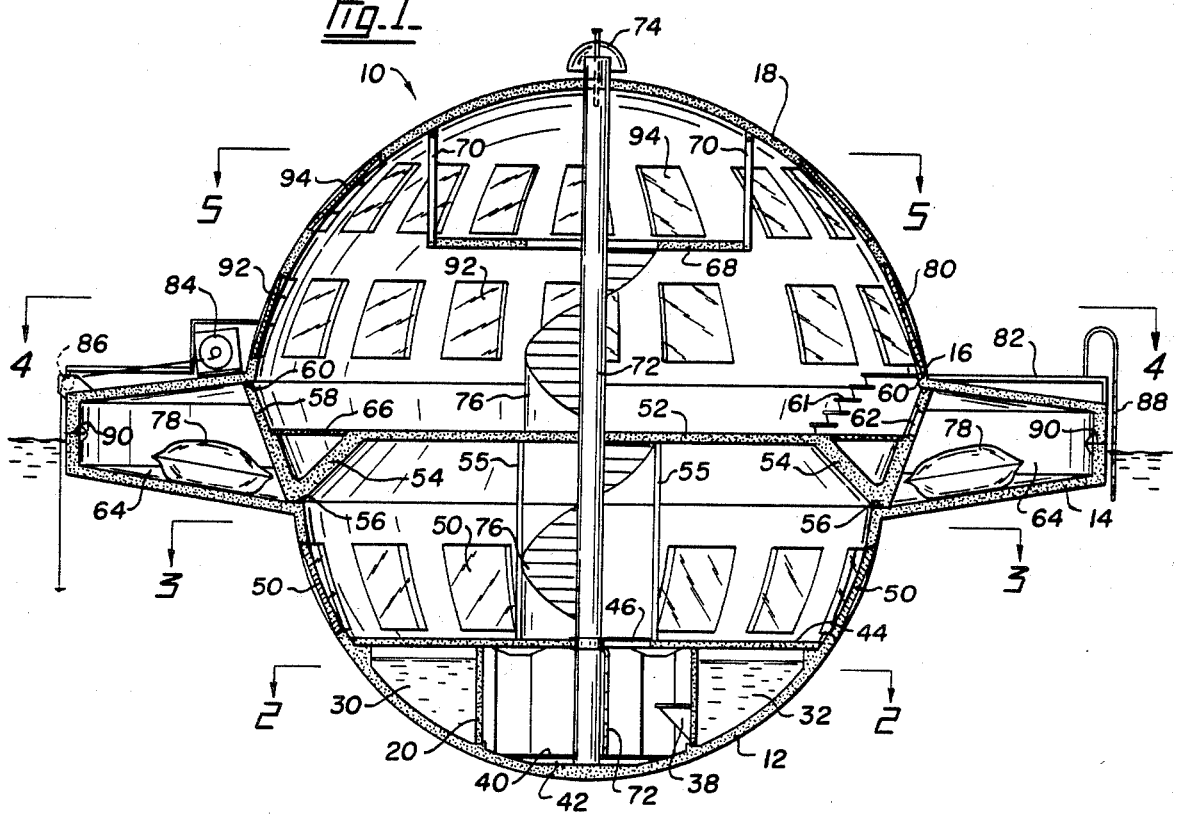
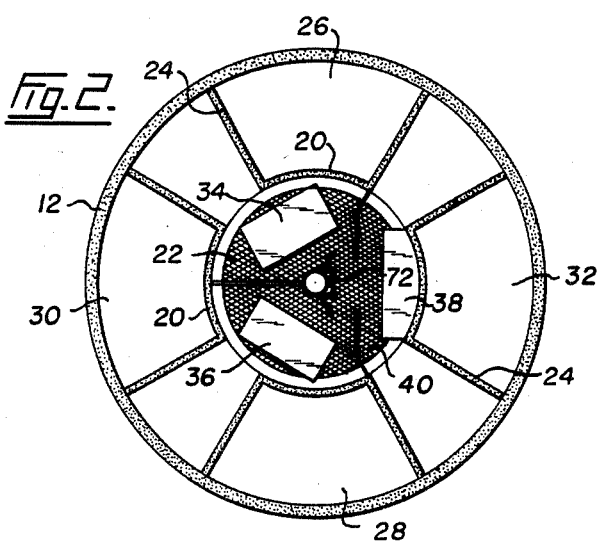

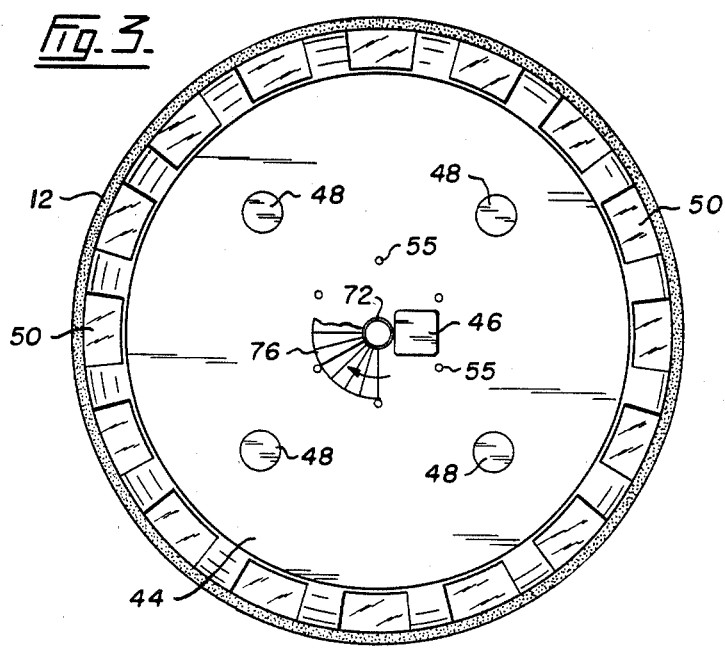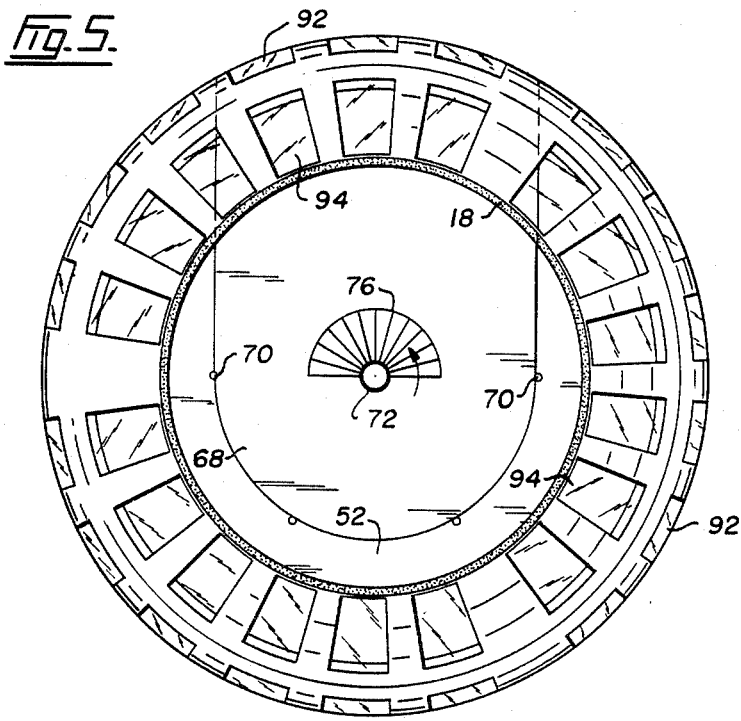

SEMI-SUBMERGIBLE SPHERICAL RESIDENTIAL STRUCTURE

This is a division of application Ser. No. 357,181, filed Mar. 11, 1982 and now abandoned.

BACKGROUND OF THE INVENTION

The present invention relates to a semi-submergible spherical residential structure which is to be floated semi-submerged in a body of water.

Residential structures which have in the past been employed in an ocean environment have generally utilized various types of platforms either mounted on fixed pilings or floating and anchored at desired locations. Such structures have often been unable to withstand extreme weather conditions because of the requirement for extreme structural rigidity. Such structures are also severely limited in size because large structures require tremendous strength in order to withstand the direct impact of ocean waves and wind under storm conditions. Morever, the structures which have been mounted on pilings suffer the additional disadvantages of being difficult to move from one location to another and usually being prone to attack by marine life such as wood borers.

It is desirable to provide a structure which can function for a number of different seagoing uses including offshore residential structures, structures intended to provide seagoing recreational activities including underwater observation, floating stations for underwater exploration and study and many other uses. The structure should have an optimum strength to weight ratio, be designed so as to eliminate points of concentrated stress, be stable against pitch and roll in response to wave action be relatively unsinkable and to have sufficient strength to be able to withstand accidental grounding.

SUMMARY OF THE INVENTION

According to the invention there is provided a semi-submergible spherical residential structure to be floated in a body of water having a substantially spherical shell and a hollow annular sponson affixed to the exterior of the shell around its maximum girth with the sponson being parallel to the water surface when the structure is floating in a body of water. The outer diameter of the sponson is sufficiently large so as to stabilize the shell when floating in a body of water and has a width sufficiently great so as to provide adequate reserve buoyancy to the shell when the latter is weighted.

Preferably, the outer diameter of the sponson is greater than 1.5 times the diameter of the sphere.

The width of the sponson as measured along the sponson axis from one line of intersection with the shell to the other is greater than about ⅛ the distance from the water line to the lowest point of the structure when floating in water.

The structure may include a plurality of spaced apart floors parallel to the annular ring and supported from the interior surface of the shell as well as having an access door in the shell above the sponson.

The volume displacement of the sponson is preferably sufficient to keep the shell afloat in the event an opening develops in the shell below the level of the sponson while the structure is floating.

In another aspect of the invention there is provided a method of fabricating a spherical residential structure which includes fabricating a lower spherical half shell having an annular sponson integral with the half shell. To the interior surface of the bottom of the lower half shell there is erected a plurality of room forming walls. With the walls thus formed machinery and equipment are then installed in the rooms. A lower floor is then formed over the room walls. Next a main floor integral with an annular downwardly inclined skirt and an integral upwardly and outwardly inclined sponson wall is formed such that the bottom of the skirt is mounted on the upper edge of the lower half shell. An annular wall portion having an upper surface continuous with the upper surface of the main floor is erected such that it is supported around its outer periphery by the sponson wall and around its inner periphery by the main floor. Finally an upper spherical half shell is erected over an upper interior edge 60 of the sponson 14.

Preferably, a plurality of viewing plates or windows are formed around the lower half shell above the level of the lower floor.

The spherical shape of the residential structure optimizes the strength to weight ratio and minimizes points of concentrated stress which would be inherent in most other shapes. By weighting the structure below the water line dynamic stability is achieved by location of the center of gravity below the water line. The annular sponson provides several advantages including "form stability" or stability and damping against pitch and roll movement in response to wave action. The sponson, moreover, provides strengthening of the sphere in an area most likely to suffer damage in a collision.

An awning effect created by the lower edge of the sponson enhances underwater visibility through the plurality of below sea level viewing plates incorporated into the lower half shell. Finally the sponson provides a life support system for the structure through the creation of an air tight chamber capable of keeping the structure afloat in the event of collapse of any one of the under sea viewing plates. The sponson also provides a convenient place to incorporate a deck, for providing a mounting surface for anchor winches, and a boarding and embarcation platform.

The spherical residential structure thus defined is capable of a multitude of uses including use as a residential quarters, a hotel, a reseach lab and sea life observation platform, a fish farming base, an offshore base for offshore oil rigs, and a restaurant-bar, a spa or an aquarium. The foregoing list is not intended to be exhaustive but merely to provide an indication of the range of possible use for the structure.

BRIEF DESCRIPTION OF THE DRAWINGS

FIG. 1 is an elevation view of the structure in section,

FIG. 2 is a plan view in section through line 2—2 of FIG. 1,

FIG. 3 is a plan view in section taken along the line 3—3 of FIG. 1,

FIG. 5 is a plan view in section taken along the line 5—5 of FIG. 1.

DESCRIPTION OF THE PREFERRED EMBODIMENTS

Figure 4:
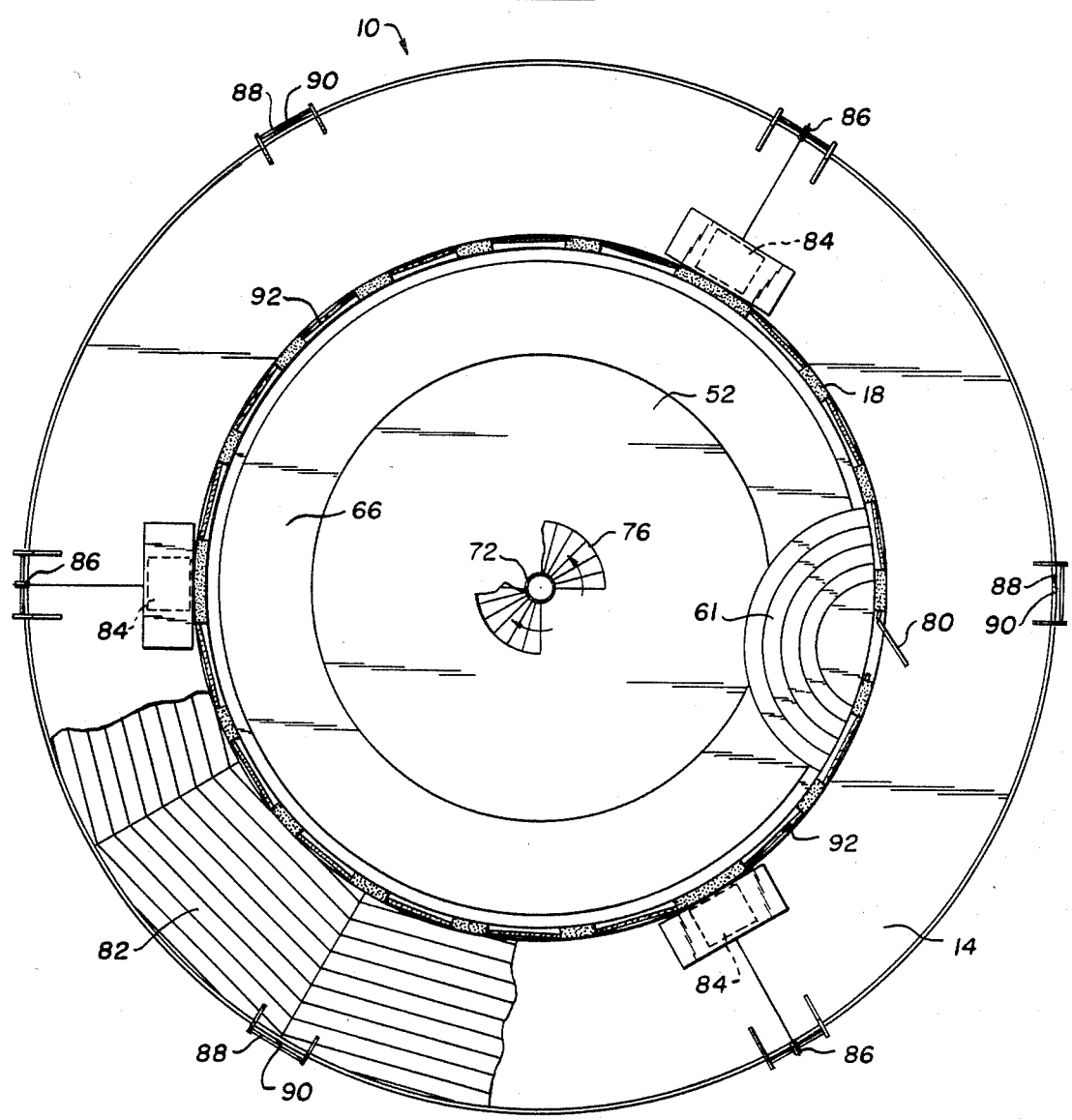
FIG. 4 is a plan view in section taken along the line 4—4 of FIG. 1.

The spherical residential structure 10 illustrated in FIG. 1 includes a lower spherical half shell 12 which is integral with a hollow annular sponson 14. Mounted over the upper inner edge 16 of the sponson 14 is an upper spherical half shell 18. At the bottom of the lower spherical half shell 12 (see FIG. 1 and FIG. 2) there are formed a plurality of vertical walls 20 which define a central cylindrical room 22 and a plurality of radially directed walls 24 connecting with the walls 20 which define a plurality of rooms 26 and 28 around the central cylindrically shaped room 22. Two of the latter rooms 26 and 28 define soil tanks for storing waste material and two of the rooms 30 and 32 define tanks for storing fuel. The remaining rooms provide storage areas for parts and areas for auxiliary machinery. The central cylindrical room 22 accommodates a 120 V.A.C. generator 34, an air conditioning unit 36, a work bench 38 and other equipment (not shown). In the central cylindrical room 22 there are a plurality of gratings 40 under which there are located sumps 42.

Over top of the vertical walls 20 and 24 there is a lower floor 44 which extends around the interior surface of the lower half shell 12. The floor 44 also includes an access port 46 to the central room 22 and a plurality of escape hatches (48) which function as access or escape ports to the rooms below (see FIG. 3).

Formed into the wall of the lower half shell 12 at a level above the lower floor 44 are a plurality of spaced apart viewing plates 50 which enable observation of marine life exterior of the shell 12. The viewing plates 50 are located immediately below the sponson 14. A main floor 52 is formed approximately intermediate of the sponson 14 extending behind its outer periphery to a downwardly and outwardly depending skirt 54 which rests on the edge 56 of the lower half shell 12. A sponson wall 58 is formed integrally with the skirt 56 and extends from the outer periphery of the latter up to a top edge 60 of the sponson 14. Incorporated into the sponson wall 58 is at least one access port 62 for permitting access from the interior of the structure into the interior 64 of the sponson 14.

An annular floor portion 66 whose top surface is continuous with the top surface of the main floor 52 extends from the outer periphery of the latter to the sponson wall 58 and is supported on the latter by an integrally formed shoulder thereon. The central area of the main floor is supported by a plurality of columns extending from the bottom surface of the main floor 52 to the top surface of the lower floor 44.

Above the main floor 52 there is suspended a loft floor 68 by means of a plurality of support posts 70. A central vent tube 72 extends from the bottom of the lower shell 12 centrally thereof to slightly above the top of the upper half shell 18. The vent tube is designed to extract gases eminating from the spaces below the lower floor 44 which might otherwise travel up into the living area of the structure. The top open end of the vent tube 72 has affixed a mushroom shaped rain cover 74. A spiral staircase 76 coiling around the vent pipe interconnects the lower floor 44 with the main floor 52 and the latter with the loft floor 68. A plurality of water tanks 78 are installed around the interior of the sponson 14. Formed into the upper half shell 18 is a door 80 which provides access from the interior of the structure to a deck 82 formed on the top of the sponson 14 by means of stairs 61 extending from the main floor 52. The upper surface of the sponson 14 also acts as a support base for anchor winches 84, anchor warp rollers 86, ladders 88 and other structures. On the outer vertical wall of the sponson 14 there may be incorporated a plurality of spaced apart eye bolts 90 which permit attachment of lines to the structure.

Additional viewing windows or plates 92 and 94 trapezoidal in shape are spaced around the upper spherical half shell 18. The plates are comprised of tempered or laminated duel pane glass windows housed in aluminium frames and are adapted to be of the pop out or escape hatch type.

The additional view are illustrated in FIGS. 4 and 5 illustrate plan views showing the various features discussed with respect to FIG. 1.

The sponson 14 is located proximate the maximum girth of the spherical structure such that the water line of the assembled structure is intermediate the sponson 14. The width of the sponson 14 as taken from the line of intersection of the latter with the upper spherical half shell 18 and the corresponding line of intersection with the lower spherical half shell 12 is at least ⅓ the vertical distance from the water line to the lowest point of the structure below the water. By fabricating the sponson 14 with such a width and by ensuring that the outer diameter of the sponson 14 is greater than 1½ times the diameter of the sphere, adequate reserve bouyancy is provided in the event the structure becomes weighted by an additional load such as, for example, water entering into the structure as a result of a rupture of one of the viewing windows 50.

A further effect of making the outer diameter of the sponson 14 more than 1½ times the diameter of the sphere is to provide form stability for damping of the pitch, roll, yawl and surge of the structure in response to wave and wind action.

The method of fabricating the spherical residential structure involves first fabricating the lower spherical half shell 12 and sponson 14. The material used is reinforced concrete which has the advantage of providing sufficient structural strength and being impervious to water. With the lower half shell 12 thus formed the plurality of room forming walls 20 and 24 are then formed in the lower portion of the lower half shell 12. Over top of the walls 20 and 24 there is formed the lower floor 44.

Next a main floor 52 and integral downwardly and outwardly inclined skirt 54 is formed integral with the sponson wall 58. The lower floor is supported centrally thereof by a plurality of columns 55 extending from the top surface of the lower floor 44 to the bottom surface of the main floor 52.

An upper spherical half shell 18 is erected over the upper interior edge 60 of the sponson 14. Following erection of the upper spherical half shell 18, the central vent tube 72, the staircase 76 and other parts of the structure are then installed. The vent tube 72 is installed so that a short portion thereof protrudes through the upper central portion of the upper half shell 18.

A wooden decking assembled over the top surface of the sponson 14 provides a flat area for walking.

In the event of rupture of a viewing plates or window 50 in the area between the main floor 52 and the lower floor 44 the structure becomes weighted with water. However, the displacement required to submerge the sponson 14 in view of the fact that it is hollow is sufficient to maintain the entire structure afloat.

The area within the vent tube 72 provides a means for locating service lines while that between the skirt 54, the sponson wall 58 and the floor portion 66 is used as a sump.

Obviously the various hatches 46 and 48 leading to the rooms located below the lower floor 44 should be gas tight to avoid entry of gases produced by the generator, the soil tank, fuel tank etc.

Other various modifications, and departures lying within the spirit of the invention and scope as defined by the appended claims will be obvious to those skilled in the art.

We claim:

1. A method of fabricating a spherical residential structure comprising:
    (a) fabricating a lower spherical half shell and sponson around the maximum girth of the half shell on a submergible support;
    (b) erecting a plurality of room-forming walls to the bottom of said lower half shell;
    (c) installing machinery and equipment in said rooms;
    (d) forming a lower floor on the top of said walls;
    (e) forming a main floor integral with an annular skirt extending downwardly and outwardly from the outer periphery of said floor to an upper edge of said lower half shell and integral with an upwardly and outwardly inclined sponson wall extending from the outer periphery of said skirt to an upper inner edge of said sponson;
    (f) erecting an upper spherical half shell over said lower half shell such that a lower edge of said upper half shelf an inner upper edge of said sponson; and
    (g) lowering said submergible support in a body of water to float said structure.

2. A method as defined in claim 1, comprising erecting a vent tube extending centrally of said structure from the bottom of said lower half shell upwardly to slightly beyond the outer surface of said upper half shell.

3. A method as defined in claim 1, further comprising erecting an upper floor above said main floor and constructing a circular staircase around said vent tube from said lower floor upwardly around said vent tube to said upper floor.

4. A method as defined in claim 1 further comprising erecting a deck over said upper shelf to provide a walking surface thereon.

5. A method as defined in claim 1 or 2, further comprising erecting a plurality of spaced apart support posts around the said vent tube between the lower floor 30 and the main floor 34 providing support to the latter.

* * * * *